(12) United States Patent
Choi et al.

(10) Patent No.: US 10,640,080 B2
(45) Date of Patent: May 5, 2020

(54) SAFETY BELT INCLUDING PLATE-TYPE LOAD LIMITER

(71) Applicants: Hyundai Motor Company, Seoul (KR); Kia Motors Corporation, Seoul (KR)

(72) Inventors: Kum-Lim Choi, Seoul (KR); Hyung-Moo Lee, Hwaseong-si (KR); Eun-Suk Suh, Seoul (KR); In-Ju Lee, Seoul (KR); Jong-Ho Kwon, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 24 days.

(21) Appl. No.: 16/188,909

(22) Filed: Nov. 13, 2018

(65) Prior Publication Data
US 2019/0241153 A1 Aug. 8, 2019

(30) Foreign Application Priority Data
Feb. 5, 2018 (KR) .................. 10-2018-0014099

(51) Int. Cl.
*B60R 22/28* (2006.01)
*F16F 7/12* (2006.01)

(52) U.S. Cl.
CPC ........ *B60R 22/28* (2013.01); *B60R 2022/286* (2013.01); *B60R 2022/289* (2013.01); *F16F 7/12* (2013.01)

(58) Field of Classification Search
None
See application file for complete search history.

(56) References Cited

U.S. PATENT DOCUMENTS

| | | | | |
|---|---|---|---|---|
| 4,025,111 | A * | 5/1977 | Tanaka | B60N 2/2806 297/467 |
| 4,457,251 | A * | 7/1984 | Weman | A44B 11/2561 116/203 |
| 5,588,609 | A * | 12/1996 | Ohsumi | B60R 22/341 242/376 |
| 5,700,034 | A * | 12/1997 | Lane, Jr. | B60R 21/01 280/805 |
| 5,997,097 | A * | 12/1999 | Engelhard | B60R 22/28 297/470 |
| 6,145,881 | A * | 11/2000 | Miller, III | B60R 22/1951 280/801.2 |
| 8,641,096 | B1 * | 2/2014 | Kohlndorfer | B60R 22/28 280/805 |
| 9,168,890 | B1 | 10/2015 | Jaradi | |
| 9,487,157 | B1 * | 11/2016 | Vinton | B60N 2/64 |
| 2002/0096872 | A1 * | 7/2002 | Herrmann | B60R 22/28 280/805 |
| 2006/0071535 | A1 * | 4/2006 | Kim | A44B 11/04 297/465 |

(Continued)

*Primary Examiner* — David E Allred
(74) *Attorney, Agent, or Firm* — Morgan, Lewis & Bockius LLP

(57) ABSTRACT

A load limiter may include a load limiter body to which a downward pulling force and an upward pulling force are applied together in opposite directions, wherein the load limiter absorbs energy by deformation to limit the downward pulling force in a multi-stage manner and simultaneously absorbs energy by deformation to limit the upward pulling force in a multi-stage manner.

14 Claims, 5 Drawing Sheets

(56) References Cited

U.S. PATENT DOCUMENTS

| | | | |
|---|---|---|---|
| 2008/0303325 A1* | 12/2008 | Scholz | B60N 2/2806 297/250.1 |
| 2010/0051401 A1* | 3/2010 | Humfeldt | B60R 22/28 188/371 |
| 2015/0158456 A1* | 6/2015 | Cheng | B60N 2/2812 297/480 |
| 2019/0106080 A1* | 4/2019 | Jaradi | B60R 22/18 |
| 2019/0308584 A1* | 10/2019 | Eaton | B60R 22/105 |
| 2019/0351866 A1* | 11/2019 | Betz | B60R 22/28 |

* cited by examiner

A-A CROSS-SECTIONAL PERSPECTIVE VIEW

SAFETY BELT INCLUDING PLATE-TYPE LOAD LIMITER

CROSS-REFERENCE TO RELATED APPLICATIONS

The present application claims priority to Korean Patent Application No. 10-2018-0014099, filed on Feb. 5, 2018, the entire contents of which is incorporated herein for all purposes by this reference.

BACKGROUND OF THE INVENTION

Field of the Invention

The present invention relates to a load limiter; and, particularly, to a safety belt including a plate-type load limiter, which is used without limitation by a belt support structure.

Description of Related Art

In general, a vehicle safety belt (or seat belt) includes a retractor that catches and fastens a webbing and a load limiter that unfastens the webbing to loosen the belt.

For example, when a large tension is applied to the webbing in the state in which the webbing is wound on the spool in the event of collision, the load limiter limits the load applied to the webbing using the rotational force of the spool. In the instant case, the load limiter may be referred to as a webbing-wound load limiter.

Therefore, the safety belt including the load limiter can prevent the separation of a passenger from a seat by restricting the webbing with the retractor and simultaneously prevent a secondary injury to the passenger by loosening the webbing with the load limiter, in the event of vehicle collision.

However, the existing load limiter may not be applied to a five-point safety belt since it has a belt support structure suitable for a two-point safety belt.

For example, the five-point safety belt has a belt support structure in which two shoulder straps are connected to a webbing at the rear of the seat and the webbing is not wound on the spool but is directly fixed to the vehicle. Thus, the existing load limiter referred to as the webbing-wound load limiter may not be applied to the five-point safety belt due to the structure thereof.

Therefore, there is a need to develop a load limiter suitable for a five-point safety belt since the use of the five-point safety belt is increasingly expanded to baby vehicle seats as well as vehicle seats.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a safety belt including a plate-type load limiter, which is a five-point safety belt suitable for baby vehicle seats by connecting a shoulder strap to a webbing, and reduces a peak load by limiting the load applied to the webbing in a multi-stage manner in the event of collision to prevent damage on a load limiter even though a load larger than a new vehicle assessment program (NCAP) collision load is applied thereto.

Other various aspects of the present invention may be understood by the following description, and become apparent with reference to the exemplary embodiments of the present invention. Also, it is obvious to those skilled in the art to which the present invention pertains that the objects and advantages of the present invention may be realized by the means as claimed and combinations thereof.

In accordance with various exemplary embodiments of the present invention, a load limiter may include a load limiter body to which a downward pulling force and an upward pulling force are applied together in opposite directions, wherein the load limiter absorbs energy by deformation to limit the downward pulling force in a multi-stage manner and simultaneously absorbs energy by deformation to limit the upward pulling force in a multi-stage manner.

The load limiter body may include a webbing body coupled with a webbing rod under the downward pulling force, a shoulder strap body coupled with a shoulder strap rod under the upward pulling force, and a connecting body integrating the webbing body with the shoulder strap body.

Each of the webbing body and the shoulder strap body may be provided with a rod support portion, and each of the coupling of the webbing body to the webbing rod and the coupling of the shoulder strap body to the shoulder strap rod may be made by the rod support portion.

The rod support portion may include a rod holder to perform a first load limit and a load braker to perform a second load limit, and the first load limit and the second load limit may allow the forces to be limited in the multi-stage manner.

The load braker may have an end-to-end distance smaller than an end-to-end distance of the rod holder. The rod holder may be connected to the load braker by a load limit protrusion, and the load limit protrusion may be formed in the rod holder and have an end-to-end distance smaller than the rod holder. The end-to-end distance of the rod holder may be circular, and the end-to-end distance of the load braker may be rectilinear. The load limit protrusion may have a divergence structure which is expanded from the rod holder to the load braker.

Each of the webbing body and the shoulder strap body may be provided with a rod seating portion having a rod groove recessed therein, the rod seating portion may be connected to one end portion of the rod support portion.

The connecting body may have a triangular shape and be connected from the webbing body to the shoulder strap body.

The load limiter body may include an upper plate and a lower plate which each have a plate shape by press working, and the upper and lower plates may have the same shape and be fixed and integrated by a fixing member in a state in which they overlap with each other.

In accordance with various exemplary embodiments of the present invention, a safety belt may include a webbing, a shoulder strap including a left shoulder strap and a right shoulder strap, and a load limiter configured to absorb energy by deformation to limit a downward pulling force applied by a webbing rod connected to the webbing in a multi-stage manner, to absorb energy by deformation to limit an upward pulling force applied by a left shoulder strap rod connected to the left shoulder strap in a multi-stage manner, and to absorb energy by deformation to limit an upward pulling force applied by a right shoulder strap rod connected to the right shoulder strap in a multi-stage manner.

The load limiter may include a load limiter body to limit the forces in the multi-stage manner, and the load limiter body may include a webbing body having a webbing space in which the webbing rod coupled with the webbing is positioned, a left shoulder strap body having a left shoulder strap space in which the left shoulder strap rod coupled with the left shoulder strap is positioned, and a right shoulder strap body having a right shoulder strap space in which the right shoulder strap rod coupled with the right shoulder strap is positioned.

A left rod support portion and a right rod support portion may be formed to face each other in each of the webbing space and the left and right shoulder strap spaces, the left and right rod support portions being deformed.

The left and right shoulder strap bodies may be inclined to the webbing body in opposite directions.

The webbing body may be integrated with a connecting body connecting the left shoulder strap body to the right shoulder strap body. The connecting body may expand some area of the webbing body to reinforce durability of the integrated the webbing body and left and right shoulder strap bodies.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
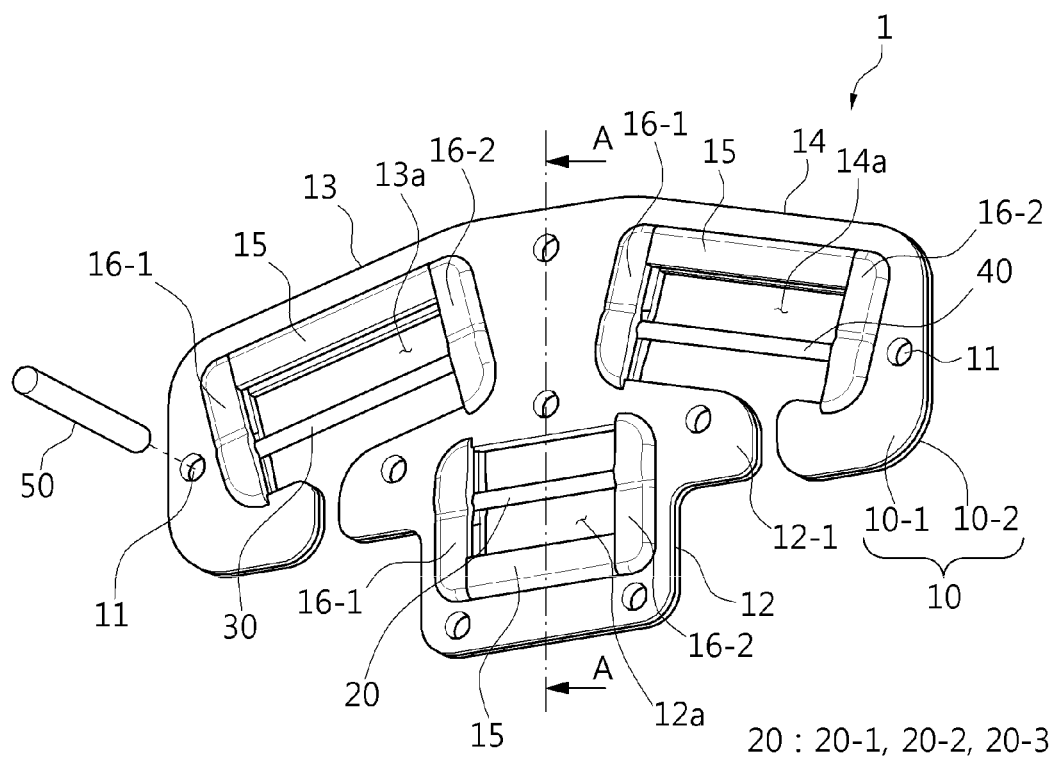
FIG. 1 is a schematic view illustrating a plate-type load limiter according to an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will be described below in more detail with reference to the accompanying drawings. The present invention may, however, be embodied in different forms and should not be construed as limited to the exemplary embodiments set forth herein. Rather, these embodiments are provided so that the present disclosure will be thorough and complete, and will fully convey the scope of the present invention to those skilled in the art. Throughout the disclosure, like reference numerals refer to like parts throughout the various figures and embodiments of the present invention.

Referring to FIG. 1, a load limiter 1 includes a load limiter body 10, a webbing rod 20, a shoulder strap rod including a left shoulder strap rod 30 and a right shoulder strap rod 40, and a fixing member 50. Especially, the load limiter 1 is manufactured as a plate-type load limiter since the load limiter body 10 has a plate structure by press working.

Hereinafter, the present embodiment will be described with respect to the load limiter body 10 limiting a load in a two-stage manner. However, this is merely one example, and its design may be changed such that a load is limited in a three or more-stage manner, i.e. In a multi-stage manner, if necessary.

For example, the load limiter body 10 includes an upper plate 10-1 and a lower plate 10-2 which are manufactured by press working. The upper and lower plates 10-1 and 10-2 have the same shape and structure such that they overlap with each other and are fixed by the fixing member 50. Furthermore, the upper and lower plates 10-1 and 10-2 have the same components such as a webbing body 12 and a shoulder strap body including a left shoulder strap body 13 and a right shoulder strap body 14. In the instant case, the webbing body 12 limits a downward pulling force as a peak load (e.g., a webbing pulling force Fa in FIG. 5) in a two-stage manner, and the respective left and right shoulder strap bodies 13 and 14 of the shoulder strap body limit upward pulling forces as peak loads (e.g., a left shoulder strap pulling force $F_{b\_left}$ and a right shoulder strap pulling force $F_{b\_right}$ in FIG. 5) in a multi-stage manner, allowing the load limiter body 10 to act as a load limiter.

The left shoulder strap body 13 is inclined downward to the left of a triangular connecting body 12-1 formed at one side of the webbing body 12 and the right shoulder strap body 14 is inclined downward to the right of the triangular connecting body 12-1, and thus the load limiter body 10 has an arrow shape (→). Therefore, the triangular connecting body 12-1 is configured to expand some area of the webbing body 12 to integrate the webbing body 12 and the left and right shoulder strap bodies 13 and 14 and to maintain the durability of the webbing body 12 and the left and right shoulder strap bodies 13 and 14 when peak loads are applied thereto.

Furthermore, the webbing body 12, the connecting body 12-1, and the left and right shoulder strap bodies 13 and 14 are formed with a fixing hole 11, a webbing space 12a, a shoulder strap space, a rod seating portion 15, and a rod support portion.

The fixing hole 11 is formed in each of the webbing body 12, the connecting body 12-1, and the left and right shoulder strap bodies 13 and 14, and is coupled to the fixing member 50 that fixes the upper and lower plates 10-1 and 10-2 in the state in which they overlap with each other. Therefore, the fixing holes 11 include a plurality of fixing holes in proper positions according to the number of fixing members.

The webbing space 12a has a closed empty quadrangular shape (e.g., "□"), and is formed in the webbing body 12 and the connecting body 12-1 so that a webbing 210 (see FIG. 8) is positioned in the webbing space 12a. The shoulder strap space includes a left shoulder strap space 13a and a right shoulder strap space 14a. The left shoulder strap space 13a has a one-end-opened empty quadrangular shape (e.g., "C"), and is formed in the left shoulder strap body 13 so that a left shoulder strap 220-1 (see FIG. 8) is positioned in the left shoulder strap space 13a. The right shoulder strap space 14a has a one-end-opened empty quadrangular shape (e.g., "C"), and is formed in the right shoulder strap body 14 so that a right shoulder strap 220-2 (see FIG. 8) is positioned in the right shoulder strap space 14a. Especially, each of the quadrangular webbing space and left and right shoulder strap spaces 12a, 13a, and 14a has four surfaces, and from among them, two facing surfaces are upper and lower surfaces and the other two facing surfaces are left and right surfaces.

The rod seating portion 15 is formed on the lower surface (or upper surface) of each of the quadrangular webbing space and left and right shoulder strap spaces 12a, 13a, and 14a. The rod support portion includes a left rod support portion 16-1 and a right rod support portion 16-2. The left rod support portion 16-1 is formed on the left surface of each of the quadrangular webbing space and left and right shoulder strap spaces 12a, 13a, and 14a. The right rod support portion 16-2 is formed on the right surface of each of the quadrangular webbing space and left and right shoulder strap spaces 12a, 13a, and 14a. Therefore, the left and right rod support portions 16-1 and 16-2 face each other.

For example, the webbing rod 20 and the left and right shoulder strap rods 30 and 40 have the same circular cross-sectional shape, but they differ from each other in that the webbing rod 20 has a length adapted to the webbing space 12a, the left shoulder strap rod 30 has a length adapted to the left shoulder strap space 13a, and the right shoulder strap rod 40 has a length adapted to the right shoulder strap space 14a. Therefore, both sides of the webbing rod 20 are fixed to the left and right rod support portions 16-1 and 16-2 in the webbing space 12a. Both sides of the left shoulder strap rod 30 are fixed to the left and right rod support portions 16-1 and 16-2 in the left shoulder strap space 13a. Both sides of the right shoulder strap rod 40 are fixed to the left and right rod support portions 16-1 and 16-2 in the right shoulder strap space 14a.

For example, the fixing member 50 is a rivet, and the overlapped upper and lower plates 10-1 and 10-2 are fixed by blunting both end portions of the fixing member 50 protruding from the fixing hole 11 in the state in which the fixing member 50 is fitted in the fixing hole 11, forming the load limiter body 10. However, the fixing member 50 may be a bolt and a nut.

Figure 2:
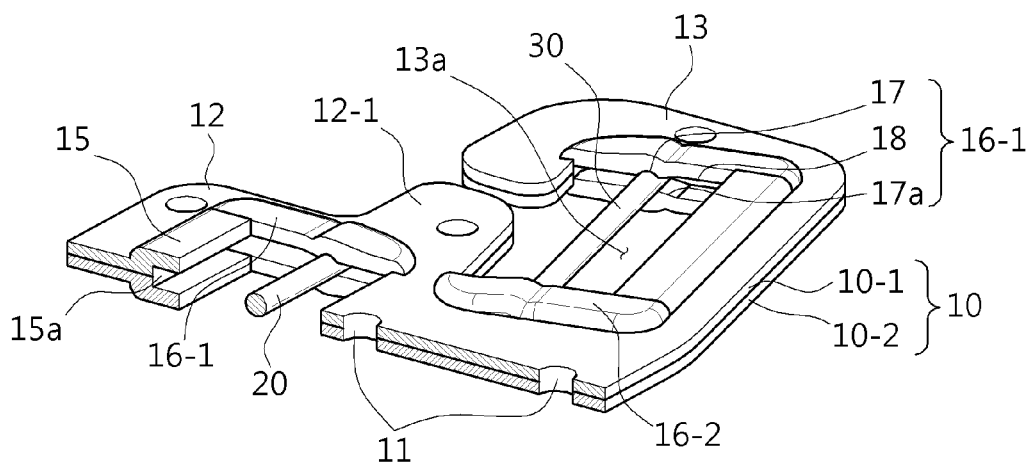
FIG. 2 is a cross-sectional perspective view illustrating the plate-type load limiter according to the exemplary embodiment of the present invention.
Figure 3:
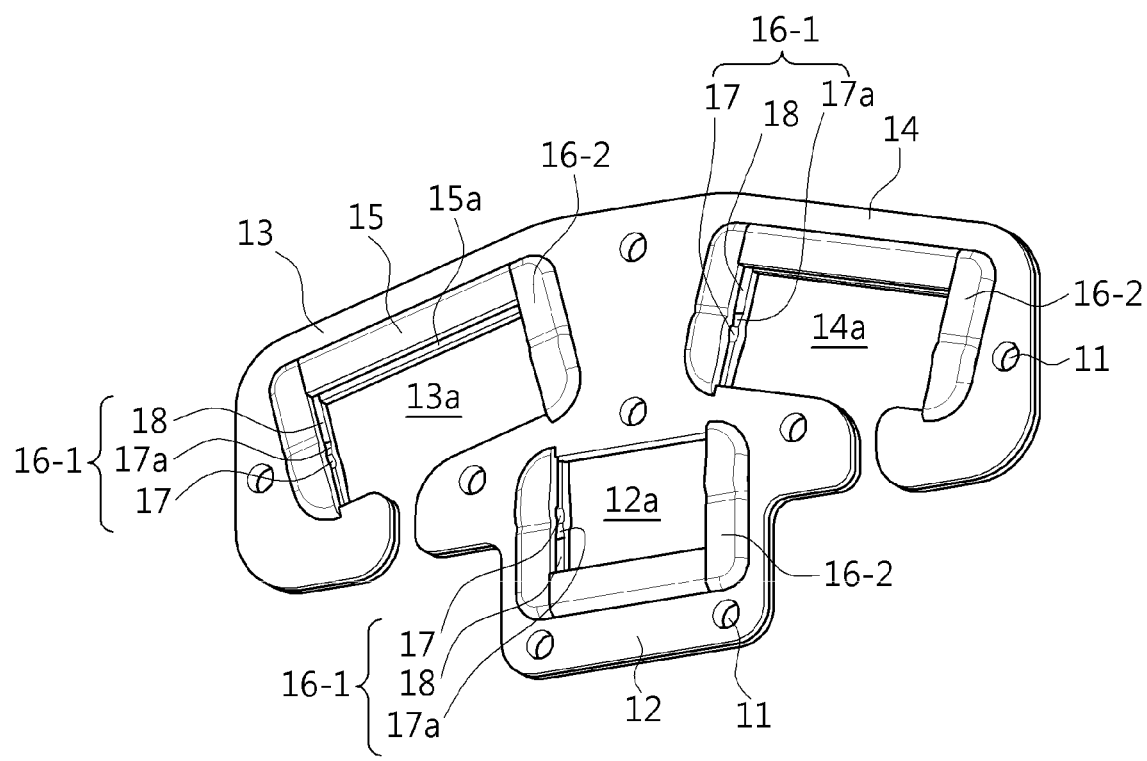
FIG. 3 is a view illustrating a body assembly of the plate-type load limiter according to the exemplary embodiment of the present invention.

FIG. 2 and FIG. 3 illustrate a detailed structure of the rod seating portion 15 and the left and right rod support portions 16-1 and 16-2.

Referring to FIG. 2, the rod seating portion 15 has a "C"-shaped rod groove 15a formed along the length thereof. Especially, since the rod groove 15a is a space in which the webbing rod 20 or the left or right shoulder strap rod 30 or 40 moves to the end portions of the left and right rod support portions and is then accommodated, the end-to-end distance of the rod groove 15a (i.e., the gap formed by the overlapped upper and lower plates 10-1 and 10-2) is larger than the diameter of the rod. Therefore, the webbing rod 20 moved in the webbing space 12a is accommodated in the rod groove 15a, the left shoulder strap rod 30 moved in the left shoulder strap space 13a is accommodated in the rod groove 15a, and the right shoulder strap rod 40 moved in the right shoulder strap space 14a is accommodated in the rod groove 15a.

Referring to FIG. 3, the left and right rod support portions 16-1 and 16-2 have the same components such as a rod holder 17, a load limit protrusion 17a, and a load braker 18.

For example, the rod holder 17 has a predetermined end-to-end distance (e.g., circular space) (i.e., the gap formed by the overlapped upper and lower plates 10-1 and 10-2) in the state in which the upper and lower plates 10-1 and 10-2 overlap with each other, to wrap the end portion of the webbing rod or left or right shoulder strap rod 20, 30, or 40 in the predetermined end-to-end distance, fixedly maintaining the webbing rod 20 or the left or right shoulder strap rod 30 or 40 until a peak load is applied thereto. In the instant case, the rod holder 17 is formed at a position which is biased in one direction at an interval from the longitudinal end portion of the left or right rod support portion 16-1 or 16-2.

The load limit protrusion 17a is formed in the rod holder 17, and leads to the load braker 18 to have a tapered shape. The tapered load limit protrusion 17a has a divergence structure which is expanded from the rod holder 17 to the load braker 18. In the instant case, the load limit protrusion 17a has an end-to-end distance (i.e., the gap formed by the overlapped upper and lower plates 10-1 and 10-2) smaller than the diameter (or width) of the webbing rod or left or right shoulder strap rod 20, 30, or 40. Therefore, the load limit protrusion 17a is distorted when a peak load is applied thereto and allows the webbing rod or left or right shoulder strap rod 20, 30, or 40 to move out to the load braker 18. Thus, since the load limit protrusion 17a is distorted to perform a first load limit by absorbing impact energy, it acts as a load limiter.

For example, the load braker 18 extends in the longitudinal direction of the left or right rod support portion 16-1 or 16-2 from the load limit protrusion 17a and the end portion thereof leads to the rod seating portion 15. Especially, the load braker 18 has a rectilinear end-to-end distance (i.e., the gap formed by the overlapped upper and lower plates 10-1 and 10-2) which is smaller than the diameter (or width) of the webbing rod or left or right shoulder strap rod 20, 30, or 40 and is greater than the end-to-end distance of the load limit protrusion 17a. Therefore, the distortion of the load braker 18 causes a continuous pulling force to restrict the movement of the webbing rod or left or right shoulder strap rod 20, 30, or 40 passing through the load limit protrusion 17a, and allows the webbing rod or left or right shoulder strap rod 20, 30, or 40 to be accommodated in the rod groove 15a of the rod seating portion 15.

Thus, since the load braker 18 is distorted to perform a second load limit by additionally absorbing impact energy, it acts as a load limiter.

As illustrated in FIG. 1, FIG. 2, and FIG. 3, the end-to-end distances of the load limit protrusion 17a and the load braker 18 and the diameters (or widths) of the webbing rod 20 and the left and right shoulder strap rods 30 and 40 may be set to have different sizes, instead of having the same size in the load limiter 1, to obtain an effect of the load limiter on many loads. Accordingly, it is also possible to expect an effect of reducing an injury to an occupant due to the weight thereof, compared to an existing load limiter limiting one load. Furthermore, it is possible to prevent damage on the load limiter 1 even though a load larger than a new car assessment program (NCAP) collision load is applied thereto.

Figure 4:
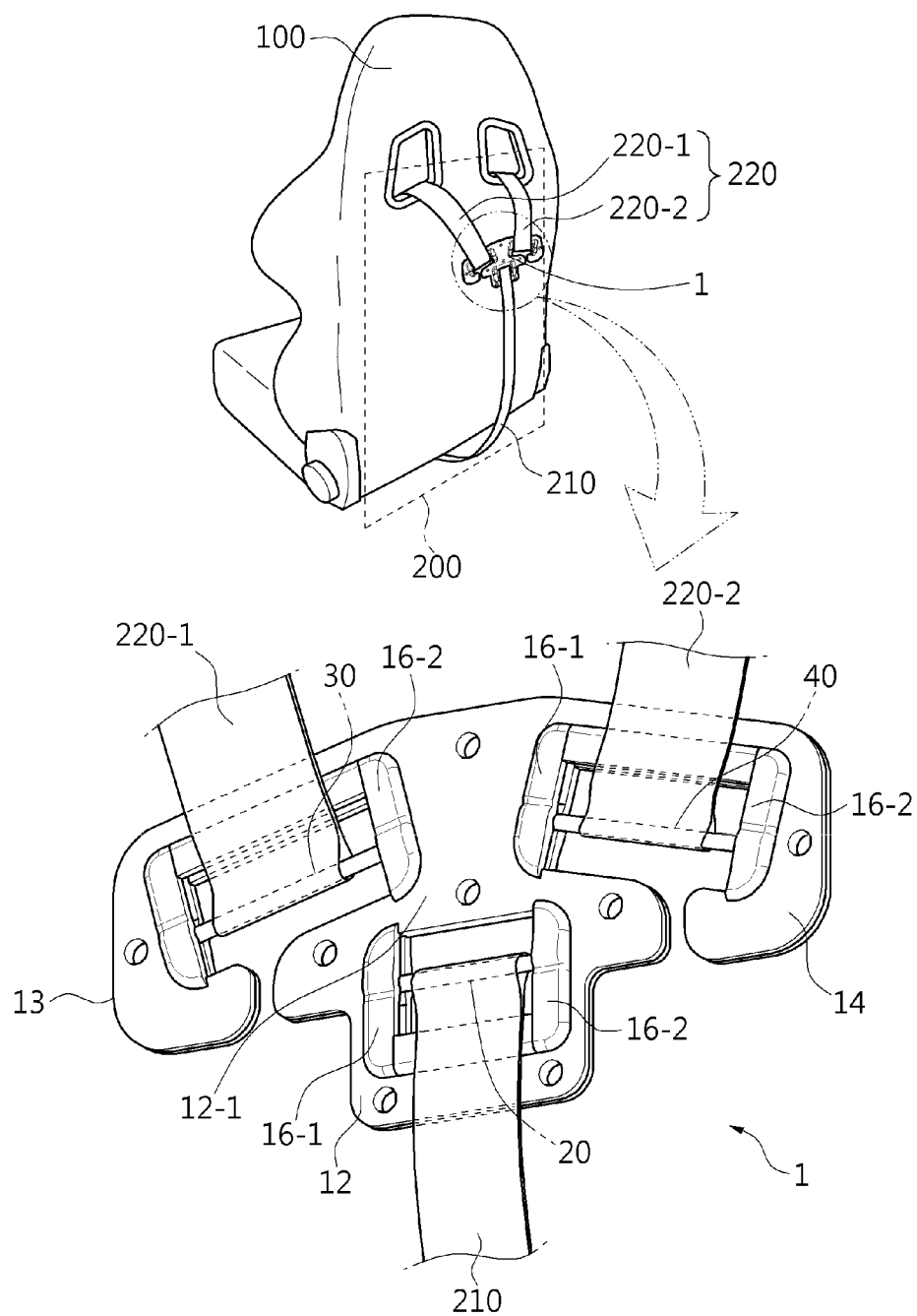
FIG. 4 is an example of a seat to which a safety belt including the plate-type load limiter is accommodated according to the exemplary embodiment of the present invention.

FIG. 4 illustrates an example of a seat 100. As illustrated in the drawing, the seat 100 includes a safety belt 200 having a load limiter 1.

For example, the load limiter 1 is a plate-type load limiter described with reference to FIG. 1, FIG. 2, and FIG. 3. The seat 100 is illustrated as a vehicle seat or a baby car seat, but the present invention is not limited thereto. The safety belt 200 is a five-point safety belt having a webbing 210 and a shoulder strap 220 including a left shoulder strap 220-1 and a right shoulder strap 220-1. In the instant case, the safety belt 200 does not include a retractor or and the retractor is connected to the webbing 210.

Therefore, the load limiter 1 is configured such that the webbing 210 is connected to a webbing rod 20 fixed in rod holders 17 of left and right rod support portions 16-1 and 16-2 in a webbing space 12a, the left shoulder strap 220-1 to a left shoulder strap rod 30 fixed in the rod holders 17 of the left and right rod support portions 16-1 and 16-2 in a left shoulder strap space 13a, and the right shoulder strap 220-1 is connected to a right shoulder strap rod 40 fixed in the rod holders 17 of the left and right rod support portions 16-1 and 16-2 in a right shoulder strap space 14a. In the instant case, the webbing 210 and the left and right shoulder straps 220-1 and 220-2 are respectively connected to the webbing rod 20 and the left and right shoulder strap rods 30 and 40 by wrapping and sewing them.

FIGS. 5 to 8 illustrate a state in which the load limiter 1 connected to the safety belt 200 acts as a load limiter limiting a load in a two-stage manner.

Figure 5:
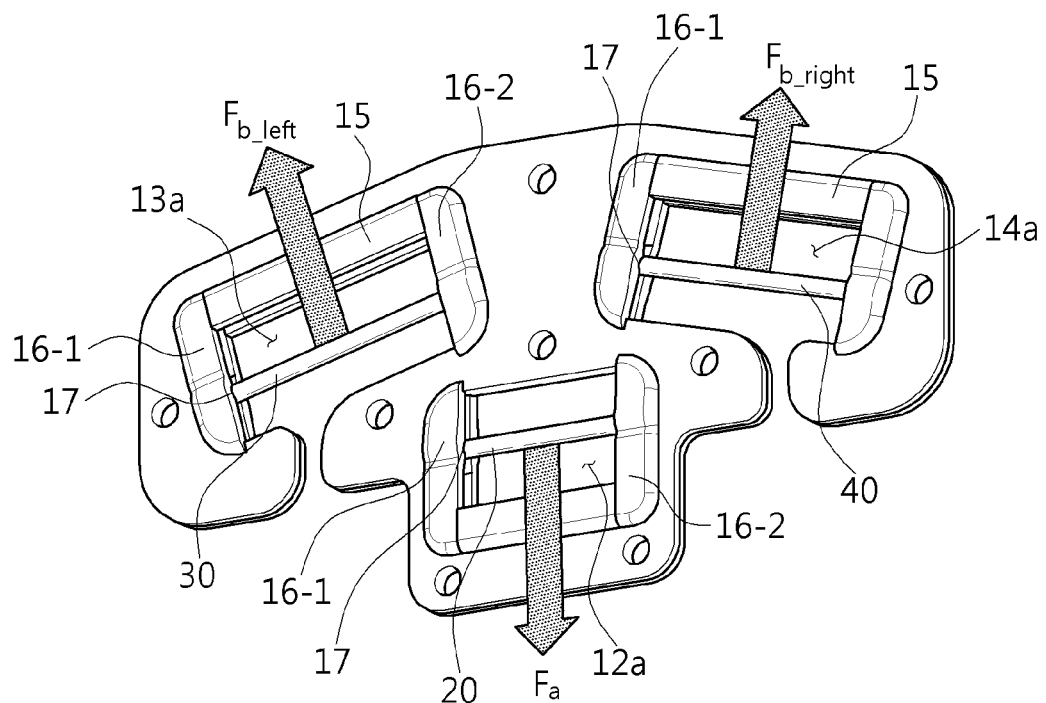
FIG. 5 is a view illustrating a state in which a load is applied to the plate-type load limiter according to the exemplary embodiment of the present invention.

FIG. 5 illustrates the movement of the load limiter 1 according to the operation of the safety belt 200 in the event of collision. As illustrated in the drawing, in the load limiter 1, a webbing pulling force Fa, which is applied to the webbing rod 20 by pulling the webbing 210, a left shoulder strap pulling force $F_{b\_left}$, which is applied to the left shoulder strap rod 30 by pulling the left shoulder strap 220-1, and a right shoulder strap pulling force $F_{b\_right}$, which is applied to the right shoulder strap rod 40 by pulling the right shoulder strap 220-2, act as peak loads.

Accordingly, the webbing pulling force Fa acts in the direction opposite to the left and right shoulder strap pulling forces $F_{b\_left}$ and $F_{b\_right}$, and the left shoulder strap pulling force $F_{b\_left}$ and the right shoulder strap pulling force $F_{b\_right}$ act in the same direction thereof. Therefore, the webbing pulling force Fa causes the webbing rod 20 fixed in the rod holders 17 to move to the rod groove 15a of the rod seating portion 15 while distorting the load limit protrusion 17a and the load braker 18. Since the left and right shoulder strap pulling forces $F_{b\_left}$ and $F_{b\_right}$ act in the same manner, each of the left and right shoulder strap rods 30 and 40 moves to the rod groove 15a of the rod seating portion 15 while distorting the load limit protrusion 17a and the load braker 18, in the state in which it is fixed in the rod holders 17.

Figure 6:
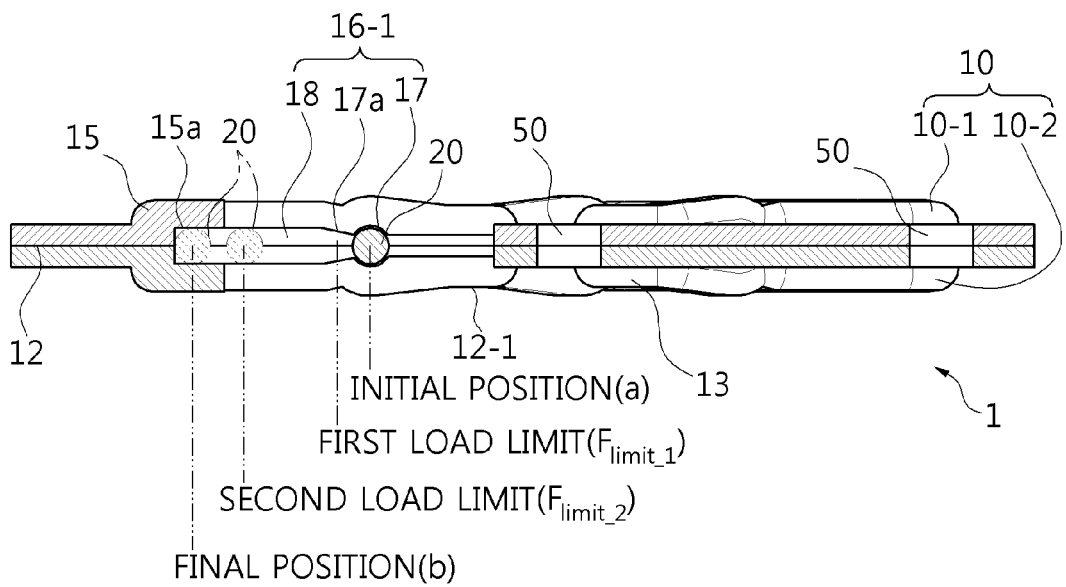
FIG. 6 is a view illustrating a state in which the plate-type load limiter limits a load in a two-stage manner according to the exemplary embodiment of the present invention.

FIG. 6 illustrates the movement of the webbing rod 20 from an initial position (a) to a final position (b) by the webbing pulling force Fa. As illustrated in the drawing, the load limit protrusion 17a performs a first load limit by absorbing impact energy while being distorted due to the end-to-end distance thereof according to the movement of the webbing rod 20, and it therefore acts as a load limiter. Subsequently, the load braker 18 performs a second load limit $F_{limit\_2}$ by additionally absorbing impact energy while being distorted due to the end-to-end distance thereof according to the movement of the webbing rod 20, and it therefore acts as a load limiter. As a result, the movement of the webbing rod 20 is stopped at a final position (b) so that the webbing rod 20 is accommodated in the rod groove 15a of the rod seating portion 15.

Figure 7:
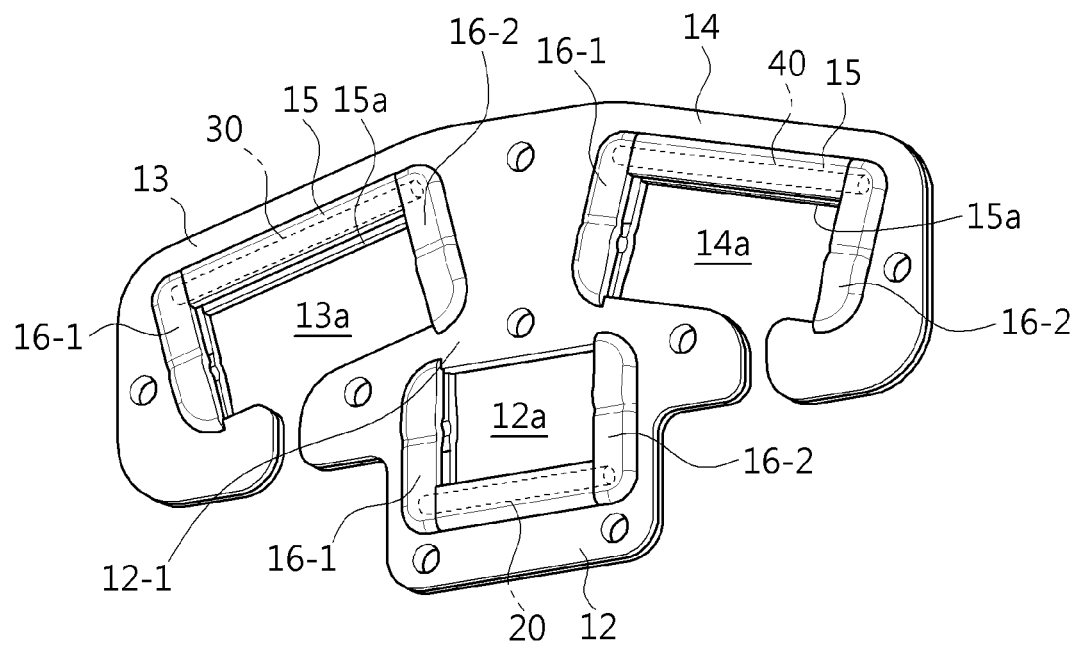
FIG. 7 is a view illustrating a state after a load is applied to the plate-type load limiter according to the exemplary embodiment of the present invention.

Referring to FIG. 7, it may be seen that each of the webbing rod 20 and the left and right shoulder strap rods 30 and 40 moves to the final position (b) at which it is accommodated in the rod groove 15a of the rod seating portion 15.

Figure 8:
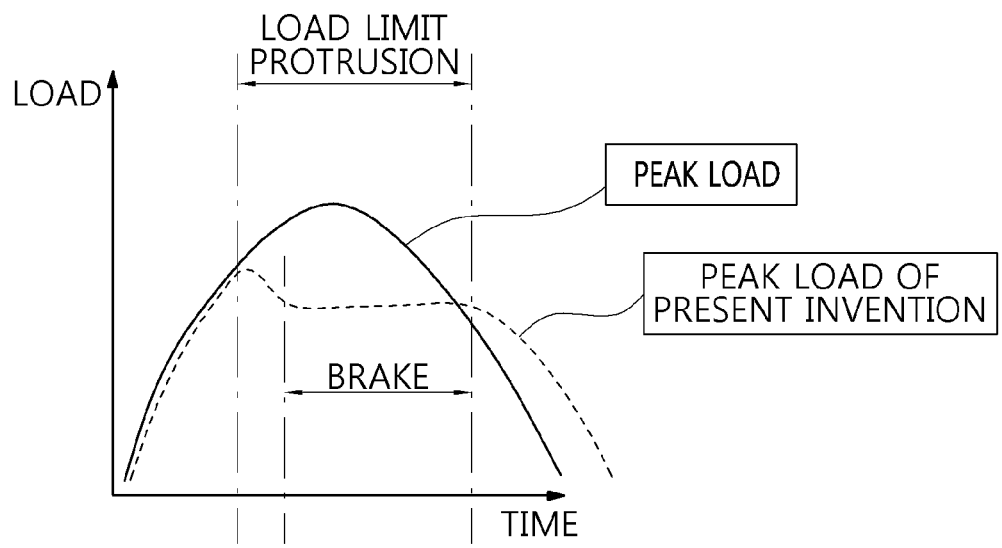
FIG. 8 is a load diagram of the plate-type load limiter according to the exemplary embodiment of the present invention.

Referring to FIG. 8, the load limiter 1 is configured as a load limiter such that the load limit protrusion 17a performs the first load limit and the load braker 18 performs the second load limit $F_{limit\_2}$. As a result, it may be seen that the reduction of peak load in the load limiter 1 is experimentally proved from the load-time diagram of the load limiter.

As described above, the safety belt 200 according to the present embodiment includes the load limiter 1 connected to the webbing 210, to which the downward pulling force is applied, and the left and right shoulder straps 220-1 and 220-2 to which the upward pulling forces are applied, and the load limiter 1 absorbs energy by deformation to limit the downward and upward pulling forces in the two-stage manner, reducing peak loads and preventing damage on the load limiter 1 even though the load larger than the new car assessment program (NCAP) collision load is applied thereto.

As is apparent from the above description, the load limiter of the present invention has the following action and effect since it has the plate shape and is suitable for the five-point safety belt.

Firstly, when the diameters of the shoulder strap rod and the webbing rod and the end-to-end distances of the load limit protrusion and the brake are set to have different sizes, it is possible to obtain an effect of the load limiter on many loads. Secondly, it is possible to achieve an effect of reducing the injury to the occupant due to the weight thereof, compared to an existing load limiter limiting one load. Thirdly, the load limiter has a simple structure in which the upper and lower bodies thereof are manufactured in the same shape by press working and the two bodies are fixed by rivets. Fourthly, it is possible to reduce an injury in the event of collision by limiting the load to the belt as in the existing load limiter in the case of the five-point belt or the baby car seat. Fifthly, it is possible to resolve all disadvantages of the existing load limiter in which it is difficult to correspond to tolerance due to having a very small cross-sectional area in the operating portion thereof and it is damaged when the load larger than the NCAP collision load or the load larger than the failure stress is applied thereto.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A load limiter comprising:
a load limiter body to which a downward pulling force and an upward pulling force are applied together in opposite directions, wherein the load limiter absorbs energy by deformation in the load limiter body to limit the downward pulling force in a multi-stage manner and absorbs energy by the deformation to limit the upward pulling force in a multi-stage manner;
wherein the load limiter body includes:
a webbing body coupled with a webbing rod under the downward pulling force;
a shoulder strap body coupled with a shoulder strap rod under the upward pulling force; and
a connecting body integrating the webbing body with the shoulder strap body;
wherein at least one of the webbing body and the shoulder strap body is provided with a rod support portion, and each of the coupling of the webbing body to the webbing rod and the coupling of the shoulder strap body to the shoulder strap rod is made by the rod support portion;
wherein the rod support portion includes:
a rod holder to provide a first load limit; and
a load braker to provide a second load limit,
wherein the first load limit and the second load limit cause the forces to be limited in the multi-stage manner;
wherein the rod holder is connected to the load braker by a load limit protrusion, and the load limit protrusion is formed between the load braker and the rod holder and has an end-to-end distance which is half of the rod holder; and
wherein the load limit protrusion has a divergence structure which is expanded from the rod holder to the load braker.

2. The load limiter of claim 1, wherein the load braker has an end-to-end distance less than an end-to-end distance of the rod holder.

3. The load limiter of claim 1, wherein the rod holder is in a circular shape, and the load braker is in a rectilinear shape.

4. The load limiter of claim 1,
wherein the rod support portion is one of a plurality of similar rod support portions and each of the webbing body and the shoulder strap body is provided with a respective one of the rod support portions,
wherein each of the webbing body and the shoulder strap body is provided with a rod seating portion, and
wherein each rod seating portion is connected to an end portion of the rod support portion.

5. The load limiter of claim 4, wherein each rod seating portion has a rod groove recessed therein.

6. The load limiter of claim 5,
wherein the rod groove of the webbing body has an end-to-end distance greater than a rod diameter of the webbing rod, and
wherein the rod groove of the shoulder strap body has an end-to-end distance greater than a rod diameter of the shoulder strap rod.

7. The load limiter of claim 1, wherein the connecting body has a triangular shape and connects the webbing body to the shoulder strap body.

8. The load limiter of claim 1, wherein the load limiter body has a press worked plate shape.

9. The load limiter of claim 1, wherein the load limiter body includes an upper plate and a lower plate, and the upper and lower plates have a same shape and are integrated by overlapping with each other.

10. The load limiter of claim 9, wherein the upper and lower plates are fixed and integrated by a fixing member in a state in which the upper and lower plates overlap with each other.

11. A safety belt comprising:
a webbing;
a shoulder strap including a first shoulder strap and a second shoulder strap; and
a load limiter engaged to the webbing and the shoulder strap and configured to absorb energy by deformation to limit a downward pulling force applied by a webbing rod connected to the webbing in a multi-stage manner, to absorb energy by deformation to limit an upward pulling force applied by a first shoulder strap rod connected to the first shoulder strap in a multi-stage manner, and to absorb energy by deformation to limit an upward pulling force applied by a second shoulder strap rod connected to the second shoulder strap in a multi-stage manner, wherein the load limiter includes:
a load limiter body to limit the forces in the multi-stage manner,
wherein the load limiter body includes:
a webbing body having a webbing space in which the webbing rod coupled with the webbing is disposed;
a first shoulder strap body having a first shoulder strap space in which the first shoulder strap rod coupled with the first shoulder strap is disposed; and
a second shoulder strap body having a second shoulder strap space in which the second shoulder strap rod coupled with the second shoulder strap is disposed; and
wherein a first rod support portion and a second rod support portion are formed in each of the webbing space and at least one of the first and second shoulder strap spaces, respectively, the first and second rod support portions comprising respective slots configured for being deformed by respective ones of the rods.

12. The safety belt of claim 11,
wherein each of the first and second rod support portions includes:
a rod holder configured to perform a first load limit; and
a load braker configured to perform a second load limit,
wherein the rod holder is connected to the load braker by a load limit protrusion, and
wherein the load limit protrusion is formed between the load braker and the rod holder and is in a shape of a tapered channel.

13. The safety belt of claim 11, wherein the first and second shoulder strap bodies are inclined in opposite directions relative to the webbing body and relative to a plane that bisects the load limiter body.

14. The safety belt of claim 13, wherein the webbing body is integrated with a connecting body connecting the first shoulder strap body to the second shoulder strap body, and the connecting body expands a predetermined area of the webbing body to reinforce durability of an integration of the webbing body and first and second shoulder strap bodies.

* * * * *